E. H. SMITH.
CUTTING TORCH TIP.
APPLICATION FILED MAY 21, 1918.

1,318,616.

Patented Oct. 14, 1919.

Witnesses

Inventor
ELMER H. SMITH
By his Attorneys

UNITED STATES PATENT OFFICE.

ELMER H. SMITH, OF MINNEAPOLIS, MINNESOTA.

CUTTING TORCH-TIP.

1,318,616.    Specification of Letters Patent.    Patented Oct. 14, 1919.

Application filed May 21, 1918. Serial No. 235,760.

*To all whom it may concern:*

Be it known that I, ELMER H. SMITH, a citizen of the United States, resident of Minneapolis, county of Hennepin, State of Minnesota, have invented certain new and useful Improvements in Cutting Torch-Tips, of which the following is a specification.

The object of my invention is to provide a cutting tip which may be used in a welding torch for cutting purposes whereas ordinarily a separate torch is required for each operation.

A further object is to provide a cutting tip of comparatively simple construction and one which can be easily and quickly mounted on a welding head.

The invention consists generally in various constructions and combinations, all as hereinafter described and particularly pointed out in the claims.

Figure 1:
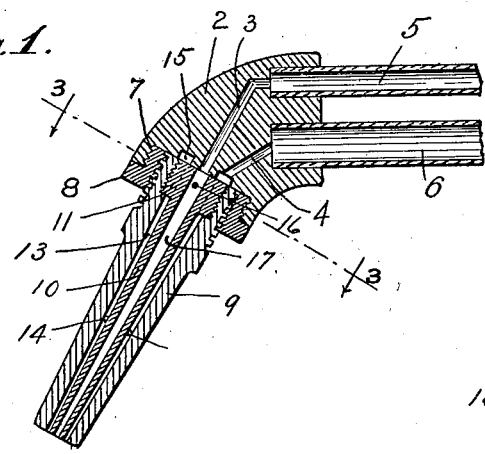
Figure 2:
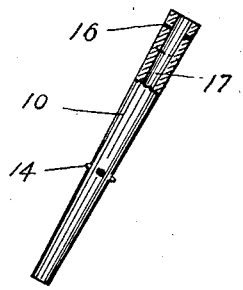
Figure 3:
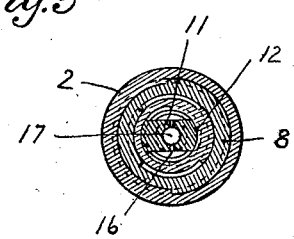

In the accompanying drawings forming part of this specification,

Figure 1 is a sectional view through a tip and torch head embodying my invention, Fig. 2 is a view, partially in section, of the inner section or member of the tip, Fig. 3 is a sectional view on the line 3—3 of Fig. 1.

In the drawing, 2 represents the head of the tip, having passages 3 and 4 formed therein communicating with pipes 5 and 6 through which oxygen and acetylene gas are conducted from a suitable source, not shown. The end of the head has a recess 7 therein to receive a bushing 8 and the outer member 9 of the tip is exteriorly threaded to engage the internal threads of the bushing 8. Within this tip is an inner tip member 10 having a flattened outer end 11 threaded at 12 to engage the internal threads of the tip member 9, a passage 13 being provided between the inner tip member and the outer one which communicates with the duct 4 for delivering the acetylene gas to this space through which it is conducted to the nozzle of the tip. This inner tip member has small teats 14 formed thereon to engage the inner surface of the outer tip member and hold the members of the tip in their proper relative position. An annular recess 15 is formed in the head at the inner end of the tip communicating with the passage 4 to conduct the acetylene gas around the end of the tip so that it can freely enter the passage 13 and be discharged at the nozzle. The inner tip member has ports 16 leading from its central passage 17 to the passage 13 and through these ports a sufficient amount of oxygen will flow to mingle with the acetylene gas and form a mixture for the heating flame. The remaining oxygen will flow down the passage 17 and contacting with the metal after it has been heated, will constitute the cutting jet, the line of cut through the metal corresponding to the diameter of this cutting jet.

Ordinarily in torches of this kind a valve is employed in the chamber adjacent the hand grip for controlling an independent oxygen flow to supply oxygen for the heating flame, a small quantity of the oxygen being carried through the valve from the oxygen supply passage to the acetylene passage, while the main oxygen supply flows through a separate tube to form a cutting jet when the heating flame has performed its work.

My invention eliminates this independent or separate oxygen tube and the necessity of providing a separate torch for the welding and cutting operations.

An ordinary welding torch equipped with one of my improved tips becomes adapted for use as a cutting torch.

I claim as my invention:

1. An oxy-acetylene torch having a head provided with a passage for acetylene gas and a passage for oxygen, and an interiorly threaded socket communicating with said passages, a cutting tip comprising an outer member exteriorly threaded to fit said socket, and having a passage therethrough, an inner member fitting within said outer member and having a portion projecting through the passage in said outer member and spaced from the walls thereof to form an annular duct, the bottom of the socket in said head having an annular groove communicating with the acetylene gas passage, and said inner member having a flattened end that is tapped into the end of said outer member, the flattened end of said inner member forming spaces communicating with said groove and with the duct in said outer member, and said inner member having a passage communicating with the oxygen duct and provided with a port adjacent said oxygen duct leading to the acetylene passage.

2. An oxy-acetylene torch having a head provided with passages for the acetylene gas and oxygen and having a socket and a groove in the bottom of said socket communicating with the acetylene gas passage, an outer tip mounted in said socket, an inner tip tapped into said outer tip and projecting into the passage in said outer tip and spaced from the walls thereof, said inner tip having a passage communicating with the oxygen passage in said head, the passage between said inner and outer tips communicating with the groove in the bottom of said socket, and said inner tip having a port communicating with said groove and with its passage and said inner tip being removable from said head with said outer tip.

3. An oxy-acetylene torch having a head provided with passages for the acetylene gas and oxygen and having a socket and a groove in the bottom of said socket communicating with the acetylene gas passage, an outer tip mounted in said socket, an inner tip tapped into said outer tip and projecting into the passage in said outer tip, and spaced from the walls thereof to form a gas passage, said inner tip having a passage communicating with the oxygen passage in said head, the gas passage between said inner and outer tips communicating with the grooves in the bottom of said socket and said inner tip having a port communicating with said groove and with the passage through said inner tip, said inner tip being removable from said head with said outer tip and said inner tip having projections formed thereon for spacing it from the walls of said outer tip.

4. An oxy-acetylene torch having a head provided with passages for the acetylene gas and oxygen, an outer tip mounted in said head and having a duct therethrough communicating with the acetylene gas passage in said head, an inner tip mounted in said outer tip and removable therewith from said head and projecting through the gas duct in said outer tip and spaced from the walls thereof, said inner tip having an oxygen duct extending therethrough communicating with the oxygen passage in said head and the walls of said inner tip duct having a port therein communicating with said duct and with the acetylene gas duct in said outer tip.

In witness whereof, I have hereunto set my hand this 10th day of May, 1918.

ELMER H. SMITH.